(12) United States Patent
Shiraishi et al.

(10) Patent No.: US 11,936,267 B2
(45) Date of Patent: Mar. 19, 2024

(54) MOTOR AND BLOWER APPARATUS

(71) Applicant: Nidec Corporation, Kyoto (JP)

(72) Inventors: Yukinobu Shiraishi, Kyoto (JP); Takashi Uchino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 164 days.

(21) Appl. No.: 17/562,215

(22) Filed: Dec. 27, 2021

(65) Prior Publication Data
US 2022/0209613 A1 Jun. 30, 2022

(30) Foreign Application Priority Data
Dec. 28, 2020 (JP) .................. 2020-219371

(51) Int. Cl.
*H02K 5/08* (2006.01)
*F04D 25/06* (2006.01)
*H02K 3/50* (2006.01)
*H02K 3/52* (2006.01)
*H02K 7/14* (2006.01)

(52) U.S. Cl.
CPC ......... *H02K 3/522* (2013.01); *F04D 25/0613* (2013.01); *H02K 3/50* (2013.01); *H02K 5/08* (2013.01); *H02K 7/14* (2013.01); *H02K 2203/03* (2013.01)

(58) Field of Classification Search
CPC .......... H02K 5/10; H02K 11/33; H02K 11/30; H02K 3/38; H02K 7/14; H02K 3/522; H02K 2203/03; H02K 5/08; H02K 1/2786; H02K 1/187; H02K 3/50; F04D 25/0613; F04D 29/282; F04D 25/0646; F05D 2300/44
USPC .................................... 310/68 R, 71
See application file for complete search history.

(56) References Cited

U.S. PATENT DOCUMENTS

| | | | |
|---|---|---|---|
| 6,359,354 B1* | 3/2002 | Watanabe | F04D 25/0693 310/43 |
| 2018/0069457 A1* | 3/2018 | Michishita | H02K 11/215 |
| 2018/0123416 A1* | 5/2018 | Yamasaki | H02K 15/0062 |
| 2020/0309191 A1* | 10/2020 | Fukushima | F16C 32/0427 |

FOREIGN PATENT DOCUMENTS

JP 2000-324745 A 11/2000

* cited by examiner

*Primary Examiner* — Alexander A Singh
(74) *Attorney, Agent, or Firm* — Keating & Bennett, LLP

(57) ABSTRACT

A blower apparatus includes a rotor, a stator, a circuit board, and a resin portion which covers the stator and the circuit board. The stator includes a conductive pin which protrudes downward from a stator core and is connected to a conducting wire to electrically connect the coil and the circuit board. The resin portion includes a first resin portion which covers the stator core and the coil, a second resin portion which covers the circuit board, and a third resin portion which is between the first resin portion and the second resin portion and covers the conductive pin. At least a portion of an outer peripheral surface of the third resin portion which intersects with an extension line extending from a center axis to the conductive pin is on a radially outer side away from the first resin portion.

10 Claims, 11 Drawing Sheets

MOTOR AND BLOWER APPARATUS

CROSS-REFERENCE TO RELATED APPLICATIONS

The present application claims priority under 35 U.S.C. § 119 to Japanese Patent Application No. 2020-219371, filed on Dec. 28, 2020, the entire contents of which are hereby incorporated herein by reference.

FIELD OF THE INVENTION

The present disclosure relates to a motor and a blower apparatus including the motor.

BACKGROUND

A conventional molded motor includes a stator unit in which a stator, a wound stator, and a control printed circuit board obtained by coupling lead wires having an inner diameter larger than the inner diameter of the stator are connected, and a rotor unit which includes a magnet at a position facing an outer circumferential side of the stator unit.

The stator is molded with resin, and a winding coil and a lead wire for supplying motor power are sealed with resin, so that the outside air is blocked. Accordingly, it is possible to improve waterproofing, drip-proofing, and rust-proofing performances.

However, in the conventional molded motor, the resin molding is performed according to the radial size of the stator along an axial direction, and thus, the resin becomes thin at the lead wire portion. Therefore, the resin may be peeled off at the lead wire portion, and the lead wire may be exposed.

SUMMARY

An example embodiment of a motor of the present disclosure includes a rotor which is rotatable around a center axis extending vertically, a stator which is on a radially inner side of the rotor and opposes the rotor in a radial direction, a circuit board which is on an axial lower side of the stator, and a resin portion which covers at least a portion of the stator and the circuit board. The stator includes a stator core which includes teeth extending outward in the radial direction, a coil which is defined by a conducting wire wound around the teeth, and a conductive pin which protrudes downward in an axial direction from a lower portion of the stator core and is electrically connected to the conducting wire to electrically connect the coil and the circuit board. The resin portion includes a first resin portion which covers at least two axial ends of the stator core and the coil, a second resin portion which covers the circuit board, and a third resin portion which is between the first resin portion and the second resin portion in the axial direction and covers the conductive pin. At least a portion of an outer peripheral surface of the third resin portion which intersects with an extension line extending from the center axis to the conductive pin is on a radially outer side from an outermost radial portion of the first resin portion.

An example embodiment of a blower apparatus of the present disclosure includes the above-described motor, and an impeller attached to the rotor to generate an airflow by rotation.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the drawings. Incidentally, in an example embodiment of the present disclosure, a center axis Cx is common to a motor 100 and a blower apparatus A. Further, in the present specification, a direction parallel to the center axis Cx is referred to by the term "axial direction", a direction perpendicular to the center axis Cx is referred to by the term "radial direction", and a direction along an arc about the center axis Cx is referred to by the term "circumferential direction".

In the present specification, the shape and the positional relationship of each portion of the blower apparatus A are described with the axial direction as the up-down direction and an intake portion 305 side of a housing 300 as an upper side. The up-down direction is a term used simply for the description and does not limit the positional relationship and the direction of the blower apparatus A and the motor 100 while in use. Further, the upstream and downstream in the flow direction of the air generated when an impeller 200 rotates are simply referred to as "upstream" and "downstream".

Figure 1:
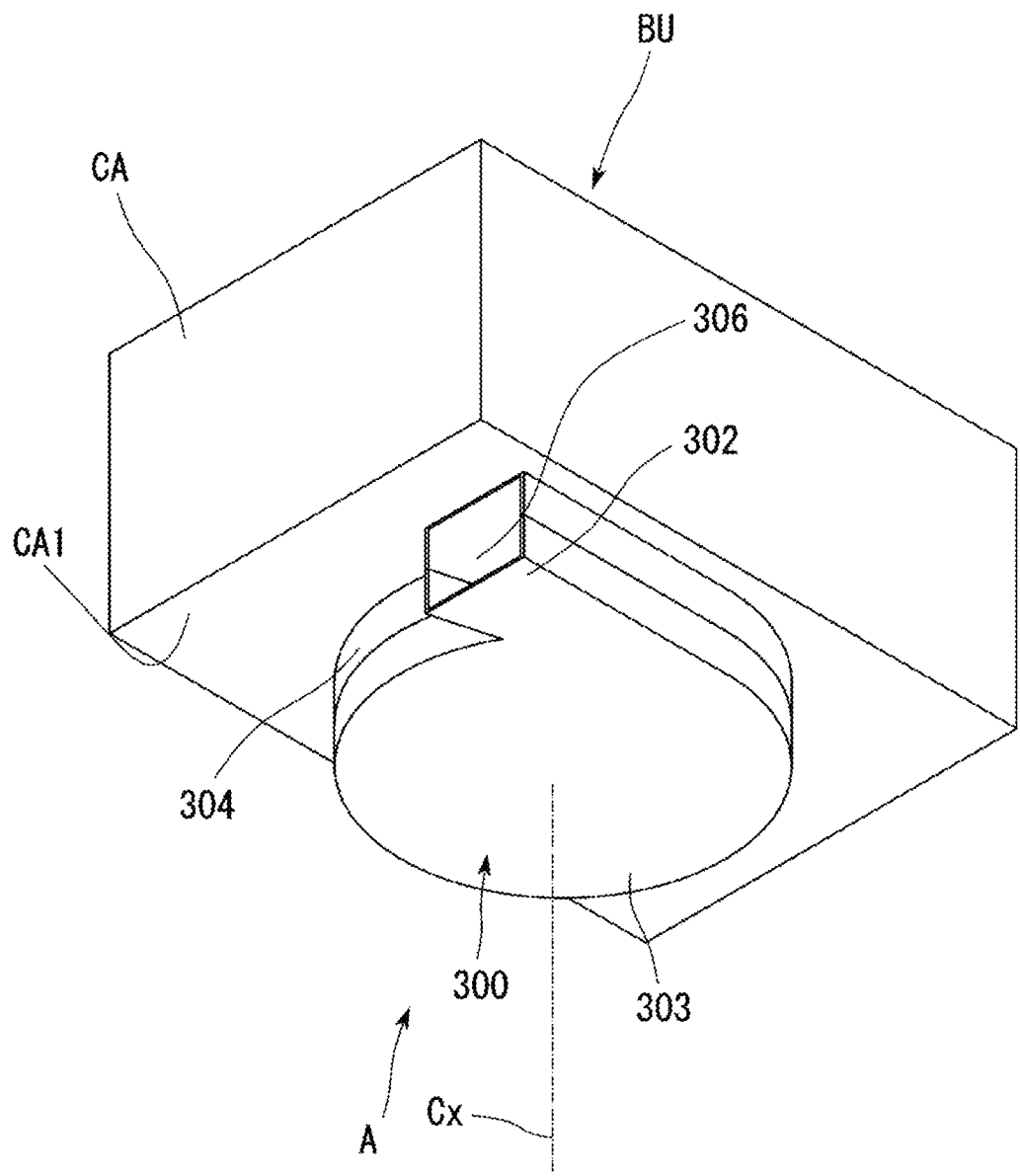
FIG. 1 is a perspective view of a battery assembly according to an example embodiment of the present disclosure as viewed from below.

The exemplary blower apparatus A of the present disclosure is used, for example, to cool a battery assembly BU. Here, the battery assembly BU is described with reference to the drawings. FIG. 1 is a perspective view of the battery assembly BU as viewed from below.

As illustrated in FIG. 1, the battery assembly BU has a rectangular parallelepiped case CA, and a battery cell (not illustrated), a charge control unit, and the like are arranged inside the case CA. The case CA is formed of a material having high thermal conductivity such as an aluminum alloy. The case CA has a flow path (not illustrated) through which an airflow flows, and has an inlet (not illustrated) through which the airflow flows into the flow path and an outflow port (not illustrated) through which the airflow flows out. Incidentally, the flow path is isolated from a portion where internal equipment is housed, and the airflow flowing through the flow path is suppressed from direct contact with an article housed in the case CA. As a result, the case CA has waterproof and dustproof properties.

In the case CA, the outflow port is formed on a lower surface CA1, and in the blower apparatus A, an intake portion 305 described later is arranged continuously with the outflow port. The blower apparatus A sucks air from the intake portion 305 and discharges air from an exhaust portion 306 described later. Then, when air is sucked from the intake portion 305, an airflow from the inlet to the outflow port is generated in the flow path of the case CA.

In the battery assembly BU, when the airflow flows through the flow path, the heat generated from the equipment arranged inside the battery assembly BU is discharged by the airflow. As a result, the battery assembly BU is cooled. Incidentally, a cooling method of the battery assembly BU is not limited to the method of flowing an airflow through the internal flow path. For example, the battery assembly BU may be cooled when a heat sink which comes into contact with the case CA and transfers the internal heat of the case CA is provided, and the heat sink is cooled by the airflow of the blower apparatus A.

Figure 2:
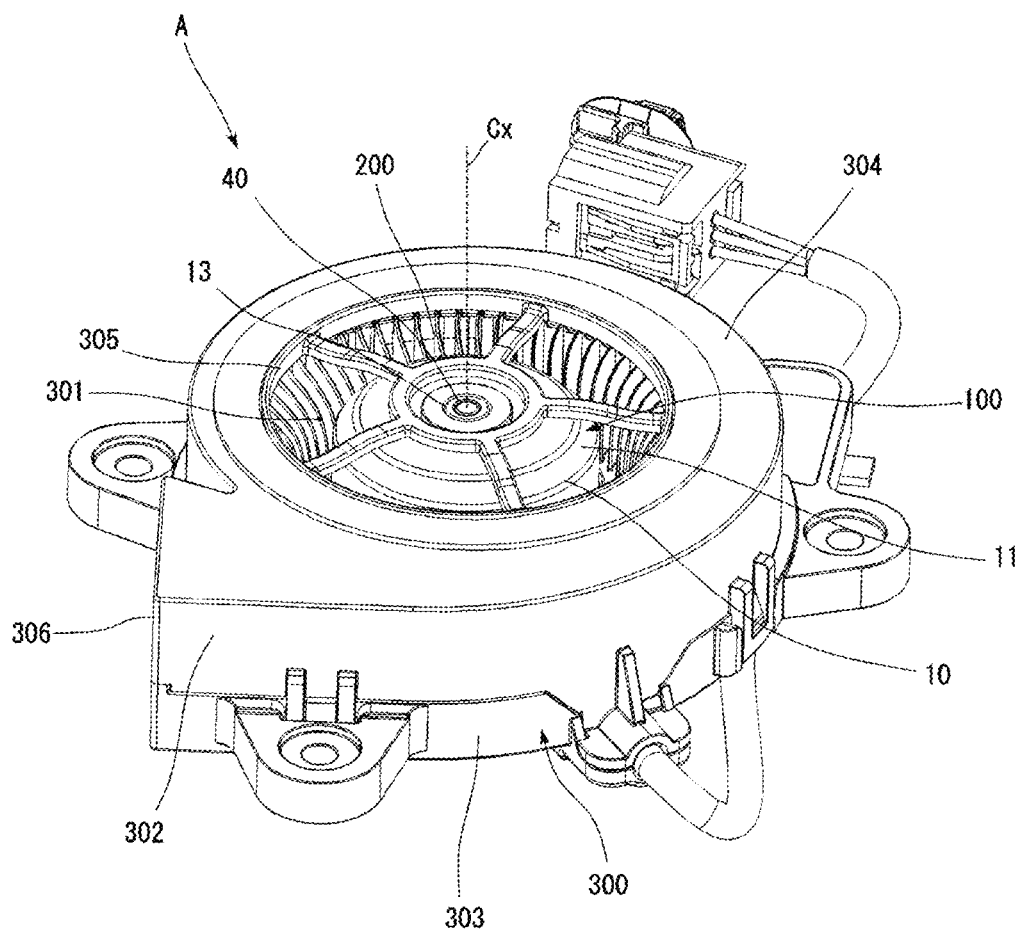
FIG. 2 is a perspective view of a blower apparatus according to an example embodiment of the present disclosure as viewed from above.
Figure 3:
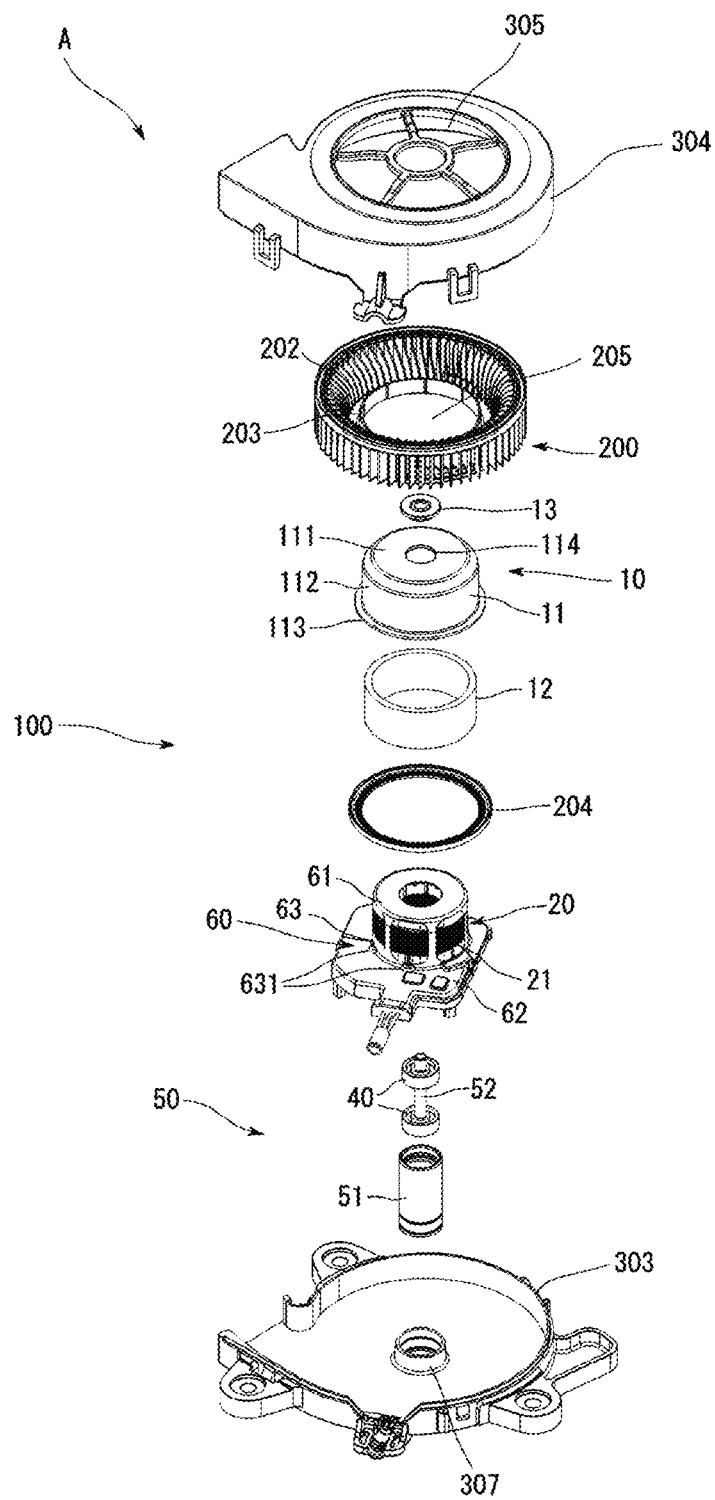
FIG. 3 is an exploded perspective view of the blower apparatus.
Figure 4:
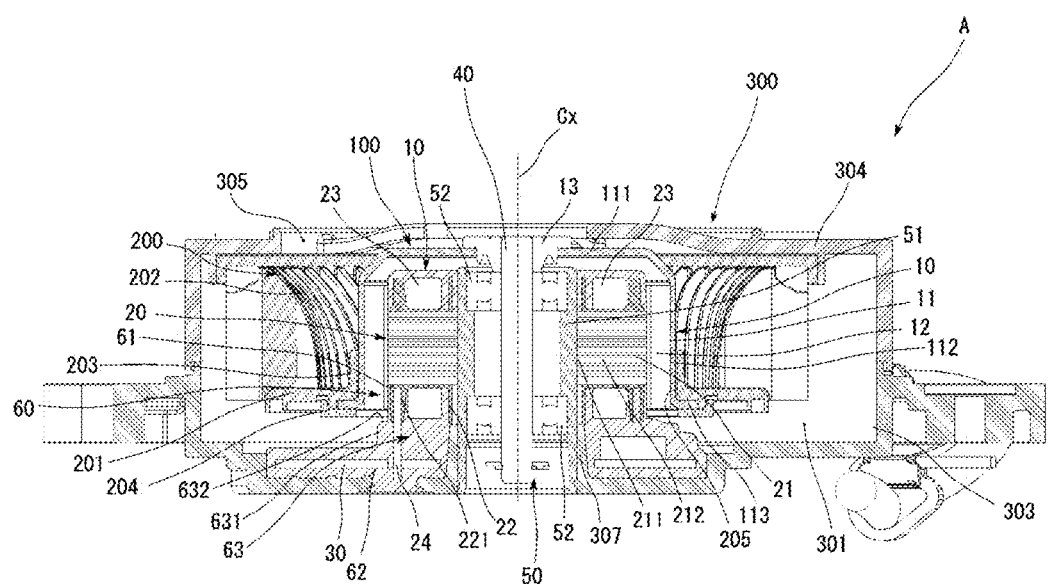
FIG. 4 is a longitudinal sectional view of the blower apparatus.
Figure 5:
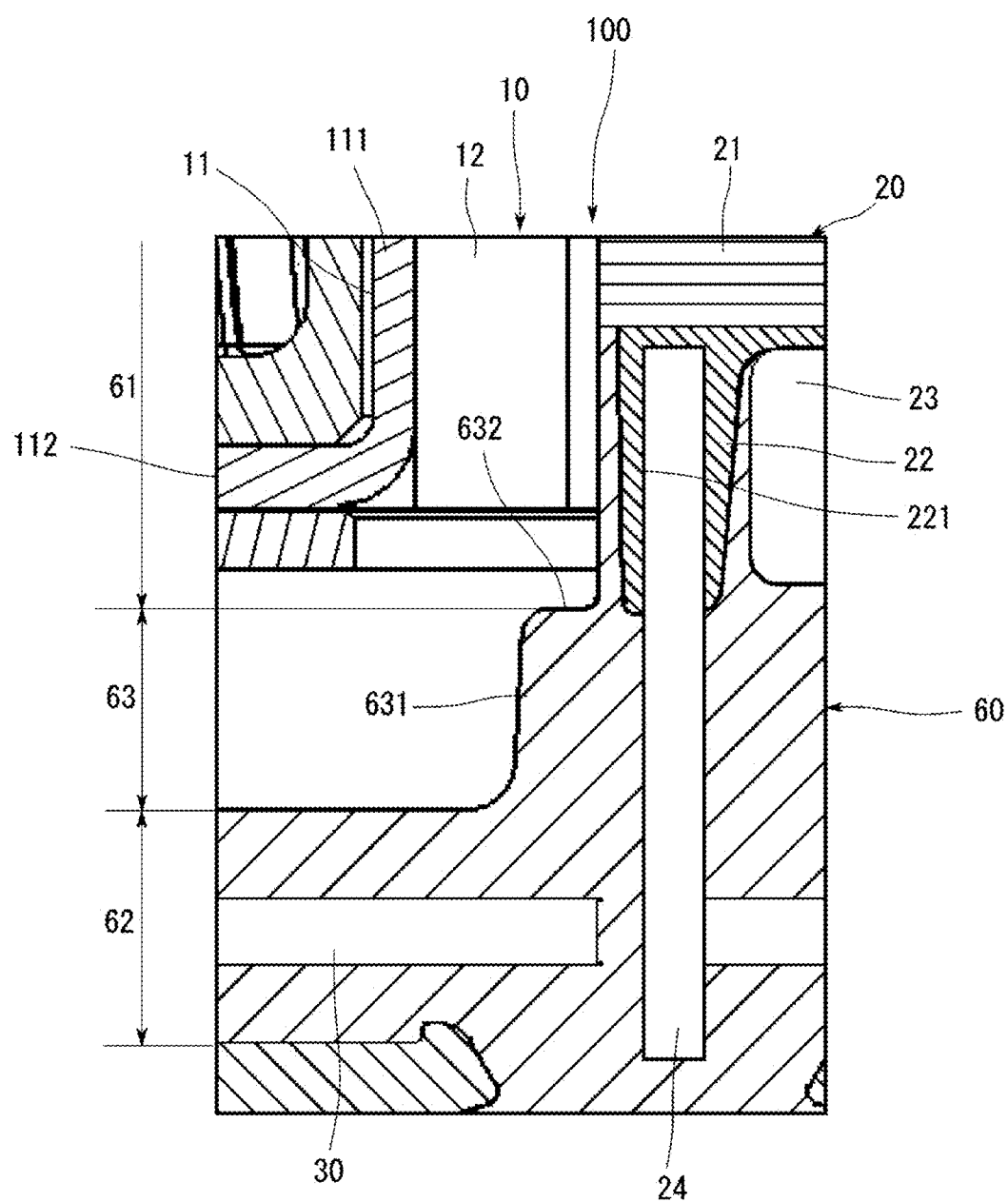
FIG. 5 is an enlarged sectional view of a motor according to an example embodiment of the present disclosure.

FIG. 2 is a perspective view of the blower apparatus A as viewed from above. FIG. 3 is an exploded perspective view of the blower apparatus A. FIG. 4 is a longitudinal sectional view of the blower apparatus A. FIG. 5 is an enlarged sectional view of a third resin portion 63. As illustrated in FIGS. 2 and 3, the blower apparatus A includes a motor 100, an impeller 200, and a housing 300. The motor 100 and the impeller 200 are arranged in the housing 300. The motor 100 is fixed to the housing 300 and causes the impeller 200 to rotate inside the housing 300. When the impeller 200 rotates, air is sent outward in the radial direction. The airflow sent outward in the radial direction moves along the outer circumference of the housing 300 and is discharged from the exhaust portion 306. Air flows in from the intake portion 305 due to the generation of airflow resulting from the rotation of the impeller 200.

As illustrated in FIG. 3, the motor 100 includes a rotor 10, a stator 20, a circuit board 30, a shaft 40, a bearing part 50, and a resin portion 60. The motor 100 is a so-called outer rotor type brushless DC motor, and the rotor 10 that faces the radial outer surface of the stator 20 in the radial direction rotates around the center axis.

The rotor 10 is arranged to be rotatable around the center axis Cx extending vertically. More specifically, the rotor 10 includes a rotor case 11, a rotor magnet 12, and a shaft fixing portion 13. The rotor case 11 is in the shape of a covered cylinder formed of a magnetic material, and includes a lid 111, a cylinder portion 112, and a flange portion 113. The lid 111 is an annular shape which has, at the center, a through-hole 114 penetrating in the axial direction. The cylinder portion 112 has a cylindrical shape and extends in the axial direction from the radial outer edge of the lid 111. The rotor magnet 12 is fixed to the inner circumferential surface of the cylinder portion 112.

The shaft fixing portion 13 is fixed to the through-hole 114 of the lid 111, and the shaft 40 is fixed to the shaft fixing portion 13. In other words, the shaft fixing portion 13 fixes the shaft 40 and the rotor case 11. That is, the rotor 10 and the shaft 40 are fixed by the shaft fixing portion 13. The flange portion 113 extends outward in the radial direction from the end portion of the cylinder portion 112 opposite to the lid 111 in the axial direction. The flange portion 113 has an annular shape.

The rotor magnet 12 has a cylindrical shape. In at least the inner circumferential surface of the rotor magnet 12, N poles and S poles are alternately arranged in the circumferential direction. In this example embodiment, the rotor magnet 12 has a cylindrical shape, but is not limited thereto. For example, a plurality of flat plate magnets may be arranged and fixed on a cylindrical rotor core in the circumferential direction.

The stator 20 is arranged on the radially inner side of the rotor 10 and faces the rotor 10 in the radial direction. More specifically, the stator 20 includes a stator core 21, an insulator 22, a coil 23, and a conductive pin 24. The stator core 21 is a laminated body in which electromagnetic steel sheets are laminated in the axial direction. Incidentally, the stator core 21 is not limited to the laminated body in which the electromagnetic steel sheets are laminated, and may be a single member, such as a fired body of powder or a casting, for example.

The stator core 21 includes an annular core back 211 and a plurality of teeth 212. That is, the stator 20 includes the stator core 21 including the plurality of teeth 212 extending outward in the radial direction. The inner surface of the annular core back 211 is fixed to the outer surface of a sleeve 51, which will be described later, of the bearing part 50. Accordingly, the center of the stator core 21 overlaps with the center axis Cx of the motor 100. Incidentally, the core back 211 and the sleeve 51 may be relatively fixed. For example, a fixing member may be interposed between the core back 211 and the sleeve 51.

The plurality of teeth 212 extend outward in the radial direction from the outer peripheral surface of the core back 211. The plurality of teeth 212 are arranged at regular intervals in the circumferential direction. The insulator 22 is formed of an insulating material such as a resin and covers at least the teeth 212. The coil 23 is formed by winding a conducting wire around the teeth 212 from above the insulator 22 which covers the teeth 212. That is, the coil 23 is formed by winding a conducting wire around the teeth 212. In the coil 23, electric currents of three types (hereinafter referred to as three phases) having different phases are supplied to the motor 100. The electric currents of the three phases are defined as a U phase current, a V phase current, and a W phase current. Then, one of the three-phase electric currents is supplied to the coil 23.

The insulator 22 electrically insulates the stator core 21 including the teeth 212 and the coil 23. That is, the stator 20 includes the insulating insulator 22 arranged between the teeth 212 and the coil 23. Incidentally, the insulator 22 is not limited to resin, and a material capable of insulating the stator core 21 and the coil 23 can be widely adopted. Incidentally, in a case where the conducting wire and the teeth 212 are insulated, the insulator 22 may be omitted.

The conductive pin 24 is attached to the lower end portion of the insulator 22 and protrudes downward in the axial direction. The end portion of the conducting wire forming the coil 23 is wound around the conductive pin 24. Incidentally, the conductive pin 24 extends straight downward in the axial direction, that is, the conductive pin 24 does not bend. Accordingly, the conducting wire can be easily wound around the conductive pin 24.

Then, by soldering the conductive pin 24 and the conducting wire, the conductive pin 24 and the coil 23 are electrically connected. Incidentally, in a case where the conducting wire is wound around the conductive pin 24 so that the conducting wire and the conductive pin 24 are electrically connected, soldering may be omitted. Further, the conductive pin 24 is electrically connected to a pattern wiring formed on the circuit board 30. That is, the conductive pin 24 protrudes downward in the axial direction from the lower portion of the stator core 21 and is electrically connected to the conducting wire to electrically connect the coil 23 and the circuit board 30.

More specifically, the conductive pin 24 is inserted into a conductive pin holding portion 221 formed on the insulator 22. Accordingly, the conductive pin 24 is fixed to the insulator 22. That is, the insulator 22 includes the conductive pin holding portion 221 having an opening at the lower end portion and housing the conductive pin 24.

The bearing part 50 includes the sleeve 51 and a bearing member 52. The sleeve 51 has a cylindrical shape and is fixed to a sleeve holding portion 307 which protrudes upward in the axial direction from the upper surface of a lower cover 303 of the housing 300. Incidentally, press-fitting can be exemplified as the fixing of the sleeve 51 to the sleeve holding portion 307. However, the disclosure is not limited to this, and a method capable of firmly fixing the sleeve 51 to the sleeve holding portion 307 of the lower cover 303 can be widely adopted. Accordingly, the center of the sleeve 51 overlaps with the center axis Cx of the motor 100.

Two bearing members 52 are arranged in the bearing part 50. The two bearing members 52 are arranged with an axial interval inside the sleeve 51. The bearing member 52 is a ball bearing, the outer ring is fixed to the inner surface of the sleeve 51, and the shaft 40 is fixed to the inner ring. Accordingly, the shaft 40 is rotatably supported by the sleeve 51 fixed to the housing 300. Further, when the two bearing members 52 are arranged apart from each other in the axial direction, it is possible to suppress the shaft 40 from being tilted with respect to the center axis Cx.

The circuit board 30 is arranged below the stator 20 in the axial direction. The pattern wiring is formed on the circuit board 30. Then, electronic components are arranged on the circuit board 30, and a circuit using the electronic components is formed by the pattern wiring. Incidentally, for example, a power supply circuit for supplying electric power to the coil 23 can be exemplified as the circuit board 30. Further, a circuit other than the power supply circuit may be formed. A through hole is formed in the circuit board 30, and the conductive pin 24 penetrates the through hole. Then, the conductive pin 24 is fixed to the pattern wiring of the circuit board 30 by soldering. Accordingly, the conductive pin 24 is electrically connected to the pattern wiring of the circuit board 30.

An electric current is supplied to the coil 23 from the power supply circuit formed on the circuit board 30 via the conductive pin 24. Each of a U phase current, a V phase current, and a W phase current is supplied to the coil 23. Therefore, the motor 100 has three conductive pins 24.

Figure 6:
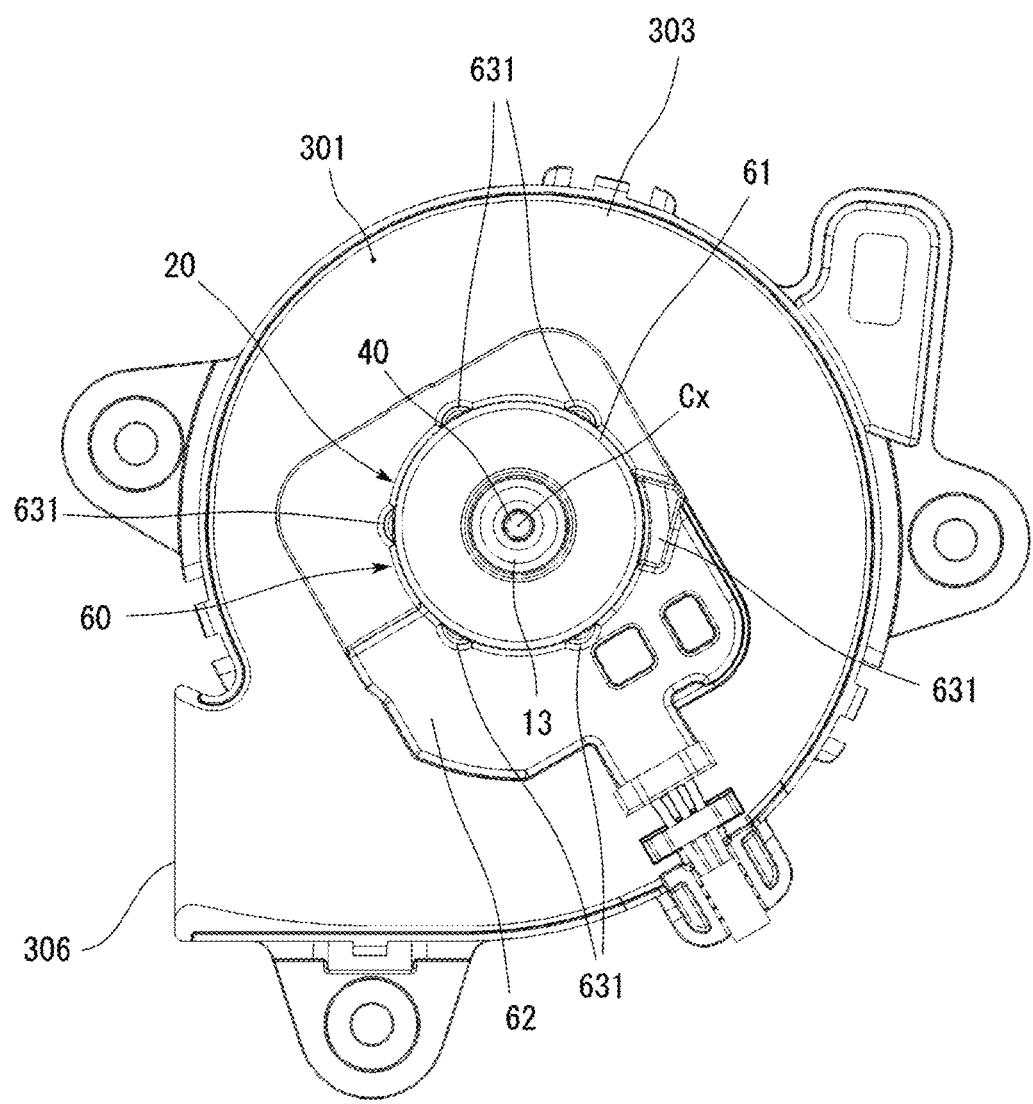
FIG. 6 is a plan view illustrating a state where a stator attached to a lower cover of a housing according to an example embodiment of the present disclosure is held.

The resin portion 60 will be described with reference to a new drawing. FIG. 6 is a plan view illustrating a state where the stator 20 attached to the lower cover 303 of the housing 300 is held. As illustrated in FIGS. 4 and 6, the resin portion 60 covers both the upper and lower axial ends of the stator 20 and the circuit board 30. That is, the resin portion 60 covers at least a part of the stator 20 and the circuit board 30.

The resin portion 60 includes a first resin portion 61, a second resin portion 62, and a third resin portion 63.

As illustrated in FIGS. 3 to 6, the first resin portion 61 covers both axial ends of the stator core 21. That is, the first resin portion 61 is a columnar shape which covers the insulator 22 and the coil 23 arranged on the teeth 212 of the stator core 21. That is, the first resin portion 61 covers at least both axial ends of the stator core 21 and the coil 23. Accordingly, the first resin portion 61 suppresses the adhesion of water, dust, dirt, or the like to the coil 23.

Incidentally, even when water, dust, dirt, or the like adheres to the radial outer edge of the teeth 212 of the stator core 21, an effect on the operation of the motor 100 is small. Therefore, in the motor 100 of this example embodiment, the radial outer edge portion of the teeth 212 is not covered by the first resin portion 61. That is, the first resin portion 61 is not arranged on the radially outer side of the first resin portion 61. Therefore, a radial gap between the teeth 212 and the rotor magnet 12 can be reduced. Accordingly, when an electric current flows through the coil 23, the magnetic force generated between the teeth 212 and the rotor magnet 12 can be increased, and the torque of the motor 100 can be increased.

The second resin portion 62 covers the circuit board 30. As illustrated in FIGS. 4 and 6, the circuit board 30 has a plate shape perpendicular to the center axis Cx. By covering the circuit board 30, the second resin portion 62 has a plate shape perpendicular to the center axis Cx. The second resin portion 62 is fixed to the lower cover 303 of the housing 300. The second resin portion 62 is arranged on the pattern wiring of the circuit board 30 and the circuit board 30, and covers the electronic components connected to the pattern wiring formed on the surface of the circuit board 30. Accordingly, it is possible to suppress foreign matter such as water, dust, and dirt from adhering to the pattern wiring and the electronic components.

The third resin portion 63 is arranged between the first resin portion 61 and the second resin portion 62 in the axial direction. As illustrated in FIGS. 4 and 5, the third resin portion 63 covers the conductive pin 24. That is, the third resin portion 63 is arranged between the first resin portion 61 and the second resin portion 62 in the axial direction and covers the conductive pin 24.

As illustrated in FIG. 3, the outer peripheral surface of the third resin portion 63 has a circular shape having the same outer diameter as that of the outer peripheral surface of the first resin portion 61. Further, the outer peripheral surface of the third resin portion 63 includes a plurality of protruding portions 631 protruding in the radial direction. As illustrated in FIGS. 3 and 6, the protruding portion 631 has a column shape having a fan-shaped bottom surface. Incidentally, the protruding portion 631 is not limited to the column shape having a fan-shaped bottom surface. For example, the protruding portion 631 may have a bottom surface having a polygonal shape such as a triangular shape and a rectangular shape. Further, the shape is not limited to the columnar shape, and may be a cone or may be a trapezoidal shape with the upper end of the cone cut off. Furthermore, the shape may be a shape which forms a part of a sphere.

As illustrated in FIG. 4, the third resin portion 63 covers the conductive pin 24. That is, the third resin portion 63 is arranged between the first resin portion 61 and the second resin portion 62 in the axial direction and covers the conductive pin 24.

The protruding portion 631 is formed as a single member with the third resin portion 63, and the protruding portion 631 is arranged on the radially outer side from the outer peripheral surface of the third resin portion 63. The third resin portion 63 has the plurality of protruding portions 631 arranged on the radially outer side from the conductive pin 24 and overlapping with the conductive pin 24 in the radial direction. Further, the plurality of protruding portions 631 are arranged in the circumferential direction, and at least the portion of the outer peripheral surface which intersects the extension line extending from the center axis Cx to the conductive pin 24 is arranged on the outer side from the radial outer edge of the first resin portion 61.

That is, at least the portion of the outer peripheral surface of the third resin portion 63 which intersects with the extension line extending from the center axis Cx to the conductive pin 24 is arranged on the radially outer side from the outermost radial portion of the first resin portion 61.

When the conductive pin 24 is covered with the third resin portion 63 in this way, the thickness of the resin covering the conductive pin 24 is increased. The conductive pin 24 is less likely to be exposed to the outside, and the contact of foreign matter such as water, dust, and dirt with the conductive pin 24 and the conducting wire can be suppressed. Further, since the thickness of the resin covering the conductive pin 24 is increased by the third resin portion 63, it is possible to suppress the resin covering the conductive pin 24 from being peeled off from the conductive pin 24. As a result, the waterproof performance and dustproof performance of the motor 100 can be improved, and the motor 100 can be operated stably for a long period of time. (Effect of claim 1) Further, the amount of resin used in the resin portion can be reduced as compared with the case of protruding the entire circumference of the third resin portion 63, and the weight of the motor 100 can be reduced.

As illustrated in FIG. 4, the upper portion of the insulator 22 is covered with the first resin portion 61, and the lower end portion of the conductive pin holding portion 221 of the insulator 22 is covered with the third resin portion 63. That is, a part of the insulator 22 is covered with the first resin portion 61, and at least the lower end portion of the conductive pin holding portion 221 is covered with the third resin portion 63. With this configuration, the entire conductive pin can be covered with the resin and the insulator. Accordingly, the conductive pins are less likely to be exposed, and the waterproof performance of the motor can be improved.

As illustrated in FIG. 4, the upper surface 632 of the protruding portion 631 faces the rotor magnet 12 of the rotor 10 in the axial direction. Incidentally, even when the protruding portion has a shape, such as a cone or a part of a sphere, which does not have an upper surface, the protruding portion overlaps with the rotor magnet 12 of the rotor 10 in the axial direction. That is, at least a part of the third resin portion 63 overlaps with at least a part of the rotor 10 in the axial direction.

Since the rotor 10 and the resin portion 60 are arranged at positions facing each other in the axial direction, it is difficult for air to flow through a gap between the rotor 10 and the resin portion 60. Therefore, the turbulence of the rotation of the rotor 10 due to the inflow of air is suppressed. Accordingly, the motor 100 can be rotated stably. In addition, it is possible to suppress the inflow of foreign matter such as water, dust, and dirt into the motor 100 together with the airflow.

In the motor 100 of this example embodiment, the first resin portion 61, the second resin portion 62, and the third resin portion 63 are formed as a single member. With this configuration, gaps are less likely to be formed between the resin portions, and foreign matter such as water, dust, and dirt can be suppressed from entering the motor 100. However, the resin portion 60 is not limited to this. When the gap can be suppressed and the bonding can be performed, the first resin portion 61, the second resin portion 62, and the third resin portion 63 may be different members, and any one resin portion may be formed independently of the other resin portions.

As illustrated in FIGS. 3 and 4, the housing 300 includes the lower cover 303 and an upper cover 304. In the housing 300, the upper cover 304 is attached on the axial upper side of the lower cover 303. The motor 100 and the impeller 200 are arranged in an internal space 301 of the housing 300.

The housing 300 includes the intake portion 305 and the exhaust portion 306. The intake portion 305 is provided on the upper surface of the upper cover 304 to penetrate in the axial direction.

The housing 300 includes a cylindrical portion 302 extending tangentially on a radial outer edge. Further, the exhaust portion 306 is an opening formed at the end portion of the cylindrical portion 302. When the impeller 200 rotates inside the housing 300, the airflow sucked from the intake portion 305 flows in the internal space 301 in the circumferential direction and is discharged to the outside from the exhaust portion 306.

The lower cover 303 includes the sleeve holding portion 307. The sleeve holding portion 307 is a cylinder centered on the center axis Cx, and extends upward in the axial direction from the bottom surface of the lower cover 303. The sleeve 51 is arranged inside the sleeve holding portion 307. The outer peripheral surface of the sleeve 51 comes into contact with the inner circumferential surface of the sleeve holding portion 307, and the sleeve 51 is fixed to the sleeve holding portion 307.

In the motor 100, the sleeve 51 is fixed to the sleeve holding portion 307 of the lower cover 303 of the housing 300. Further, the circuit board 30 is arranged in the bottom portion of the lower cover 303. Further, the stator core 21 in which the insulator 22 and the coil 23 are arranged on the teeth 212 is fixed to the sleeve 51. At this time, the end portion of the conducting wire of the coil 23 is wound around the conductive pin 24 and electrically connected by soldering. Then, the conductive pin 24 is electrically connected to the pattern wiring of the circuit board 30 by soldering.

In this state, a mold surrounding the stator 20 and the circuit board 30 is attached, molten resin is poured into the mold, and then the mold is cooled to form the resin portion 60. Incidentally, with this configuration, the resin portion 60 covers the stator 20 and the circuit board 30. Accordingly, it is possible to suppress foreign matter such as water, dust, and dirt from entering the electric circuit of the motor 100.

The impeller 200 is arranged inside the housing 300. The impeller 200 includes a base plate 201, a plurality of blades 202, an attaching portion 203, and a connection portion 204. That is, the impeller 200 includes the plurality of blades 202.

The base plate 201 is an annular shape which has, at the radial center, a through-hole 205 penetrating in the axial direction. The base plate 201 is perpendicular to the center axis Cx. The plurality of blades 202 are attached to the base plate 201. The plurality of blades 202 are arranged at regular intervals in the circumferential direction. The attaching portion 203 has a cylindrical shape that protrudes in the axial direction from the edge portion of the through-hole 205 of the base plate 201.

The inner circumferential surface of the attaching portion 203 is brought into contact with the outer peripheral surface of the cylinder portion 112 of the rotor case 11. At this time, the axial lower surface of the attaching portion 203 comes into contact with the flange portion 113 of the rotor case 11. Accordingly, the impeller 200 is positioned in the axial direction and attached to the rotor 10. That is, the attaching portion 203 fixes the blade 202 and the rotor 10.

Incidentally, the attaching portion 203 and the cylinder portion 112 are fixed by, for example, press-fitting. The fixing method is not limited to the press-fitting, and a fixing method capable of firmly fixing the attaching portion 203 and the cylinder portion 112, such as adhesion, deposition, and welding, can be widely adopted.

The connection portion 204 has an annular shape. The connection portion 204 comes into contact with the lower surfaces of the base plate 201 and the flange portion 113 to connect the rotor 10 and the impeller 200. In a case where the rotor 10 and the impeller 200 are firmly fixed, the connection portion 204 may be omitted. In the blower apparatus A, the impeller 200 is attached to the rotor 10 and rotates to generate an airflow.

As illustrated in FIG. 4, the protruding portion 631 of the third resin portion 63 is positioned on the radially inner side from the attaching portion 203. That is, the third resin portion 63 is arranged on the radially inner side from the attaching portion 203. With this configuration, a gap between the impeller 200 and the third resin portion 63 can be narrowed to suppress the inflow of air into the gap, and the ventilation efficiency of the blower apparatus A can be improved. (Effect of claim 10) In particular, in a case where a third resin portion 63a is used, a gap between the impeller 200 and the third resin portion 63a is narrowed over the entire circumference in the circumferential direction, so that the effect of improving the ventilation efficiency of the blower apparatus A is improved.

As illustrated in FIG. 4, the upper end of the third resin portion 63 is arranged on the axial lower side from the lower end of the impeller 200. With this configuration, even in a case where the impeller 200 swings during rotation, the contact between the impeller 200 and the protruding portion 631 is suppressed.

Figure 7:
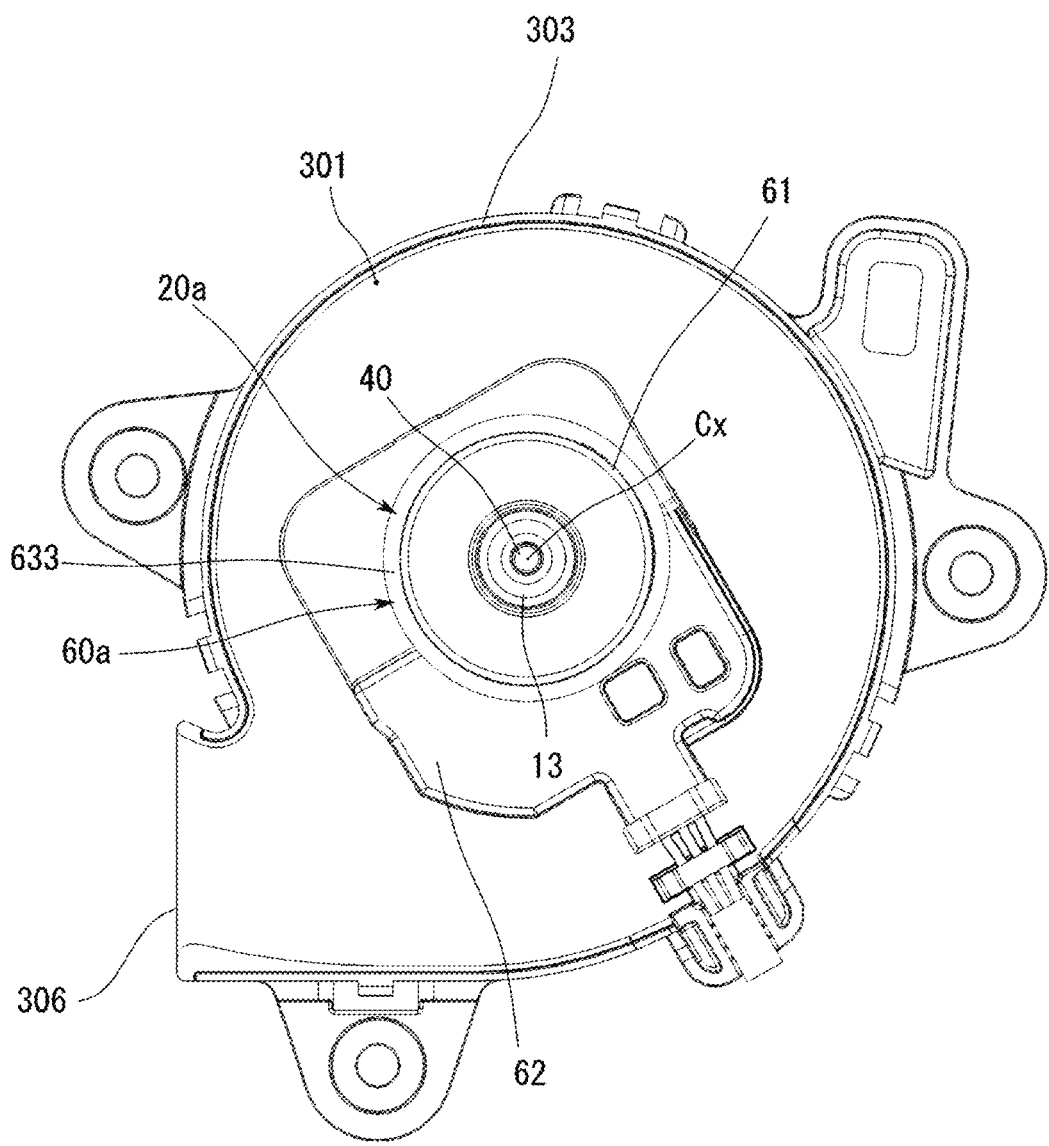
FIG. 7 is a plan view illustrating a state where a stator of a first modification of an example embodiment of the present disclosure is held.
Figure 8:
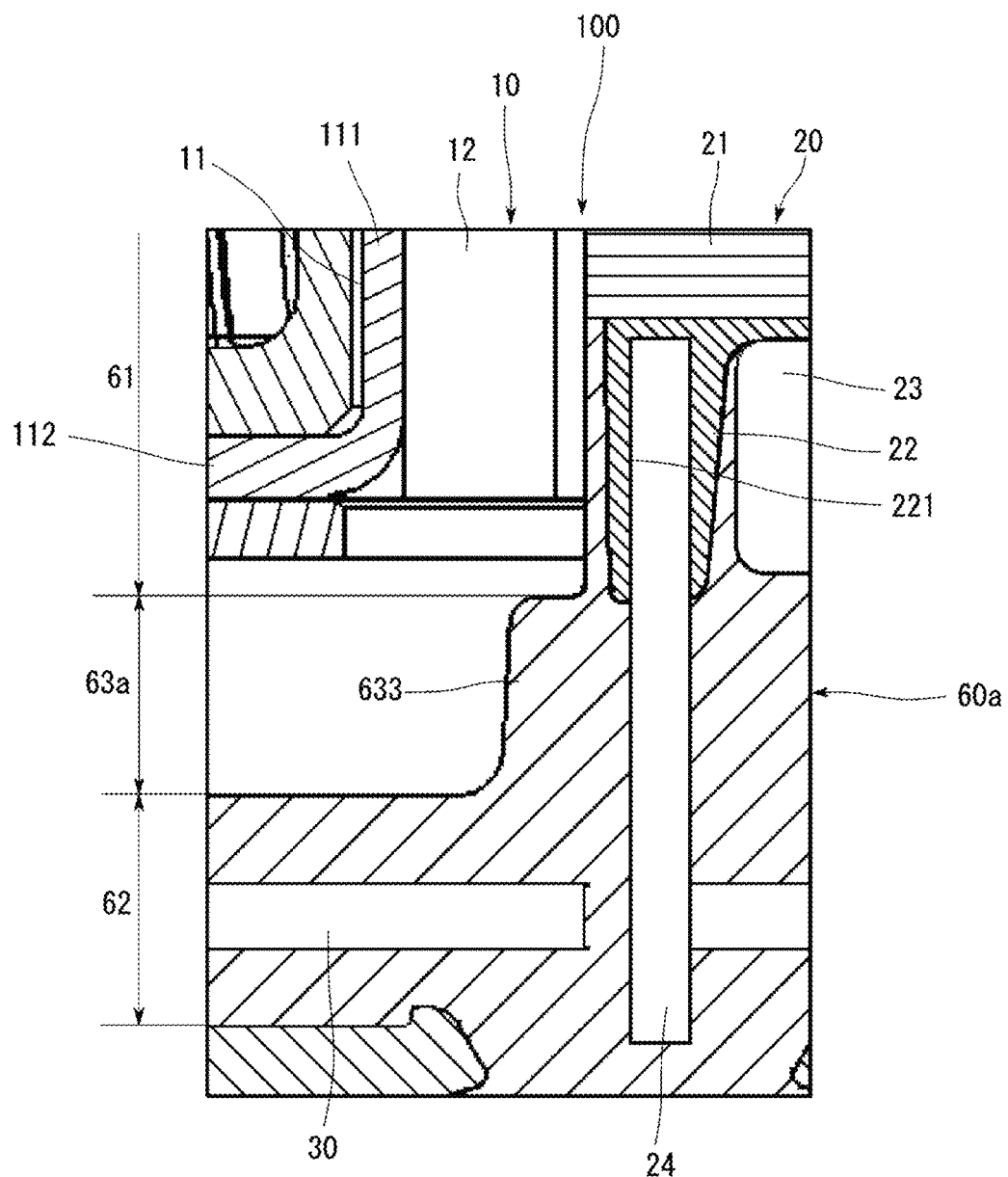
FIG. 8 is an enlarged sectional view of a third resin portion of a resin portion according to an example embodiment of the present disclosure.

FIG. 7 is a plan view illustrating a state where a stator 20a of a first modification is held. FIG. 8 is an enlarged sectional view of the third resin portion 63a of a resin portion 60a. In the resin portion 60a of the first modification, the third resin portion 63a includes an annular portion 633 instead of the protruding portion 631 of the third resin portion 63. The other portion of the resin portion 60a has the same configuration as the resin portion 60. Therefore, substantially the same portions of the resin portion 60a as those of the resin portion 60 are denoted by the same reference numerals, and the detailed description of the same portions will be omitted.

As illustrated in FIG. 7, the third resin portion 63a includes the annular portion 633. The annular portion 633 extends outward in the radial direction from the third resin portion 63a. The annular portion 633 has an annular shape and is arranged on the radially outer side from the first resin portion 61 over the entire circumference.

That is, the third resin portion 63a includes the annular portion 633. The annular portion 633 is arranged on the radial outside from the first resin portion 61 over the entire circumference. With this configuration, the rigidity of the resin portion 60a can be improved. Further, since the annular portion is arranged on the radially outer side from the first resin portion 61 over the entire circumference, a gap between the rotor 10 and the third resin portion 63a can be reduced, and it is possible to suppress the entry of air and foreign matter such as water, dust, and dirt which flows with the air through the gap between the rotor 10 and the resin portion 60. As a result, the motor 100 can be stably rotated for a long period of time. Incidentally, in this modification, the annular portion 633 has an annular shape in a plan view, but is not limited thereto. For example, the outer shape may be an ellipse, a polygon such as a rectangle, or the like.

Figure 9:
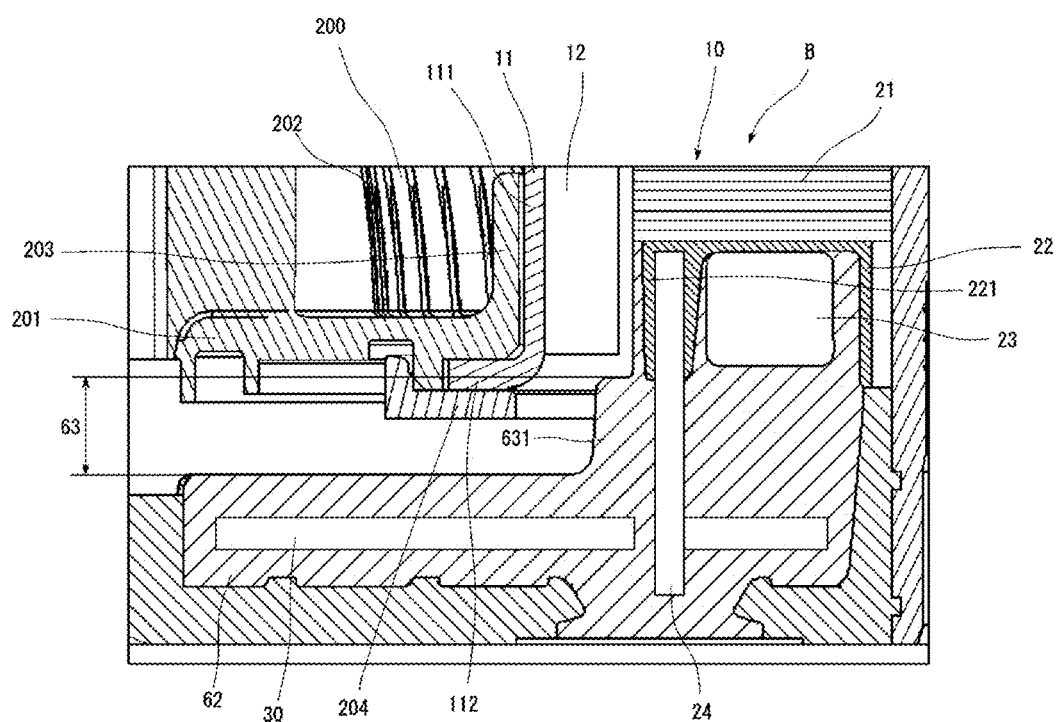
FIG. 9 is an enlarged sectional view of a blower apparatus according to a second modification of an example embodiment of the present disclosure.

FIG. 9 is an enlarged sectional view of a blower apparatus B of a second modification. The position of the lower end portion of the impeller 200 of the blower apparatus B illustrated in FIG. 9 is different from that of the blower apparatus A. Besides this, the blower apparatus B has the same configuration as the blower apparatus A. Therefore, substantially the same portions of the blower apparatus B as those of the blower apparatus A are denoted by the same reference numerals, and the detailed description of the same portions will be omitted.

As illustrated in FIG. 9, in the blower apparatus B, the upper end of the third resin portion 63 is arranged on the axial upper side from the lower end of the impeller 200. With this configuration, a labyrinth structure is formed by the lower end of the impeller 200 and the third resin portion 63. By forming the labyrinth structure, the path through which an airflow flows becomes narrower and more complicated, and thus the airflow is less likely to flow. In addition, the formation of the labyrinth structure lengthens the path through which the airflow flows. As a result, the airflow is less likely to flow between the impeller 200 and the third resin portion 63, and it is possible to suppress the entry of foreign matter such as water, dust, and dirt. As a result, the motor 100 can be operated stably for a long period of time.

Figure 10:
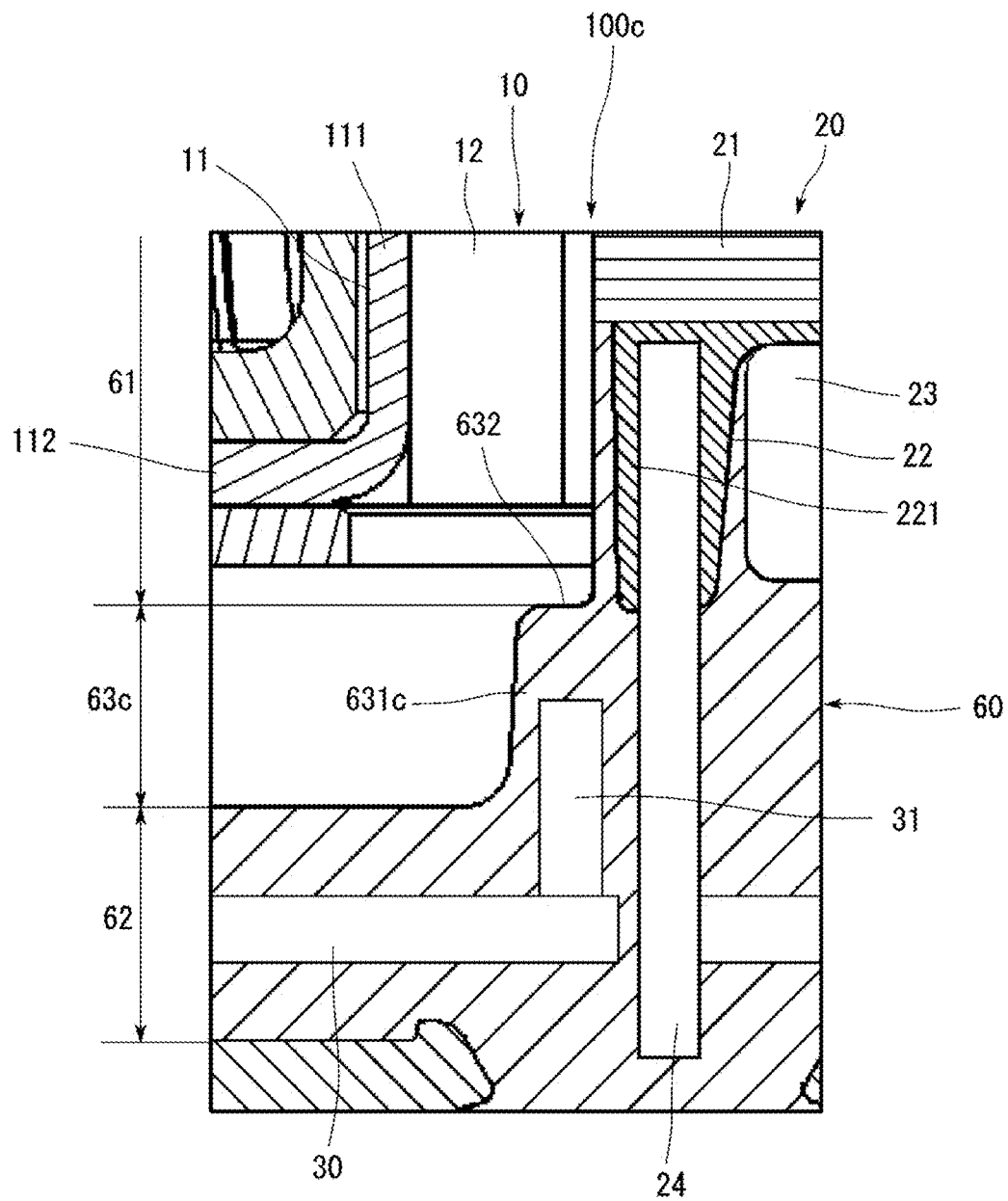
FIG. 10 is an enlarged sectional view of a motor of a third modification of an example embodiment of the present disclosure.

FIG. 10 is an enlarged sectional view of a motor 100c of a third modification. In the motor 100c illustrated in FIG. 10, a protruding portion 631c of a third resin portion 63c of a resin portion 60c covers an electronic component 31 arranged on the circuit board 30. Besides this, the motor 100c has the same configuration as the motor 100. Therefore, substantially the same portions of the motor 100c as those of the motor 100 are denoted by the same reference numerals, and the detailed description of the same portions will be omitted.

In the motor 100c illustrated in FIG. 10, the electronic component 31 arranged on the circuit board 30 is covered with the protruding portion 631c. That is, at least one of the electronic components 31 arranged on the circuit board 30 is covered with the protruding portion 631c. By covering the high electronic component 31 with the protruding portion 631c, the second resin portion 62 can be made thinner, the amount of resin used for the resin portion 60 can be reduced, and the motor 100c can be reduced in size and weight.

Figure 11:
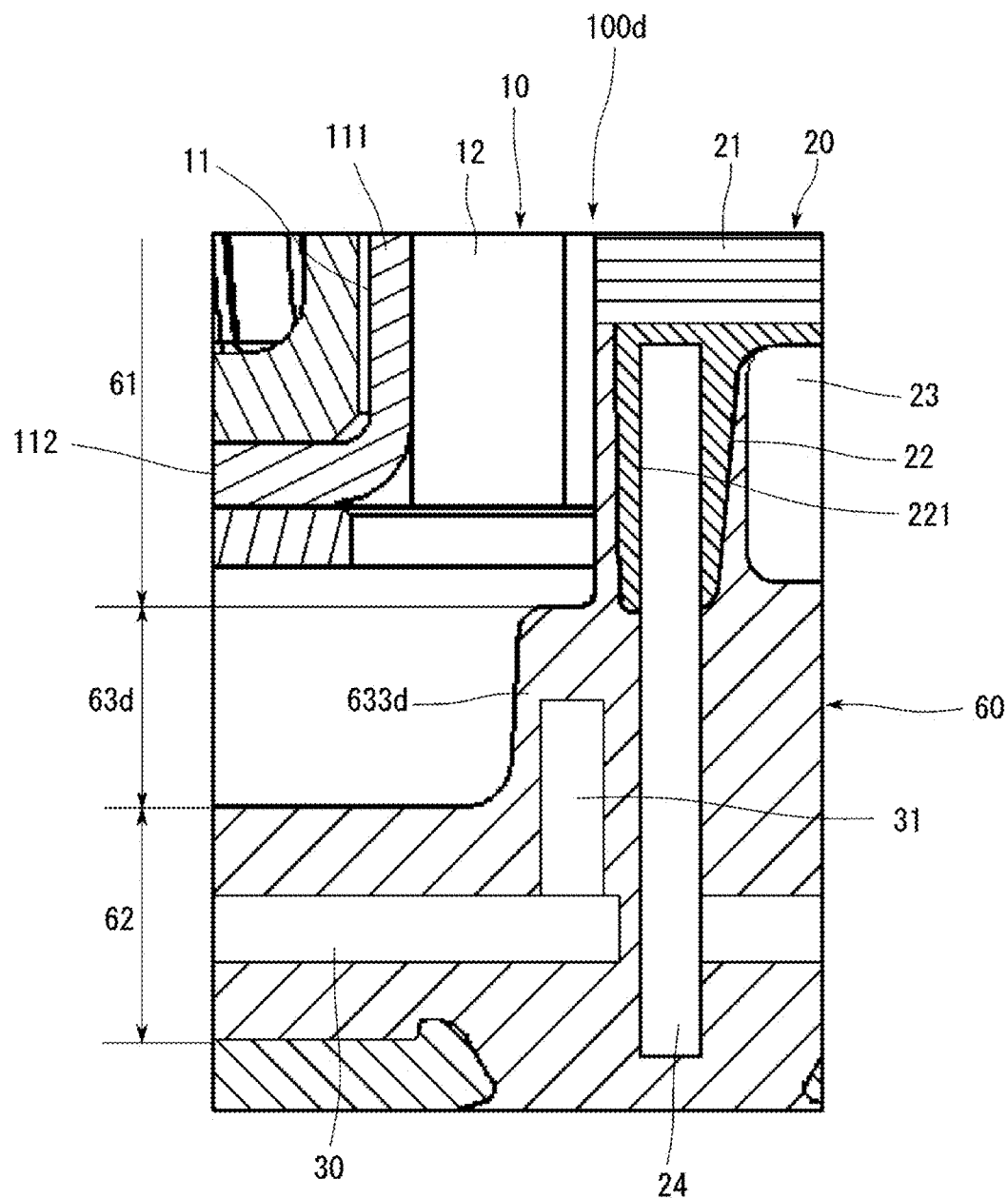
FIG. 11 is an enlarged sectional view of a motor of another example of the third modification.

As illustrated in FIG. 11, the electronic component 31 may be covered with an annular portion 633d of a third resin portion 63d of a motor 100d. That is, at least one of the electronic components 31 arranged on the circuit board 30 is covered with the annular portion 633d. By covering the high electronic component 31 with the annular portion 633d, the second resin portion 62 can be made thinner, the amount of resin used for the resin portion 60 can be reduced, and the motor 100d can be reduced in size and weight.

The present disclosure is applicable to, for example, a motor and a blower apparatus including the motor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
    a rotor which is rotatable around a center axis extending vertically;
    a stator which is on a radially inner side of the rotor and opposes the rotor in a radial direction;
    a circuit board which is on an axial lower side of the stator; and
    a resin portion which covers at least a portion of the stator and the circuit board; wherein
    the stator includes:
        a stator core which includes teeth extending outward in the radial direction;
        a coil which is defined by a conducting wire wound around the teeth; and
        a conductive pin which protrudes downward in an axial direction from a lower portion of the stator core and is electrically connected to the conducting wire to electrically connect the coil and the circuit board;
    the resin portion includes:
        a first resin portion which covers at least two axial ends of the stator core and the coil;
        a second resin portion which covers the circuit board; and
        a third resin portion which is between the first resin portion and the second resin portion in the axial direction and covers the conductive pin;
    at least a portion of an outer peripheral surface of the third resin portion which intersects with an extension line extending from the center axis to the conductive pin is on a radially outer side away from an outermost radial portion of the first resin portion;
    at least a portion of the third resin portion overlaps with at least a portion of a lower surface of the rotor in the axial direction;
    the third resin portion includes protruding portions on a radially outer side away from the conductive pin and overlapping with the conductive pin in the radial direction; and
    the protruding portions are arranged in a circumferential direction, and at least a portion of the outer peripheral surface which intersects with the extension line extending from the center axis to the conductive pin is on an outer side away from a radial outer edge of the first resin portion.

2. The motor according to claim 1, wherein at least one of electronic components on the circuit board is covered with the protruding portion.

3. The motor according to claim 1, wherein the third resin portion includes an annular portion on a radially outer side away from the first resin portion over an entire circumference.

4. The motor according to claim 3, wherein at least one of electronic components on the circuit board is covered with the annular portion.

5. The motor according to claim 4, wherein the first resin portion, the second resin portion, and the third resin portion are defined as a single monolithic structure.

6. The motor according to claim 1, wherein
    the stator includes an insulating insulator which is between the teeth and the coil;
    the insulator includes a conductive pin holding portion which includes an opening at a lower end portion and houses the conductive pin; and
    a portion of the insulator is covered with the first resin portion, and at least a lower end portion of the conductive pin holding portion is covered with the third resin portion.

7. A blower apparatus comprising:
    the motor according to claim 1; and
    an impeller attached to the rotor.

8. The blower apparatus according to claim 7, wherein
    the impeller includes:
    blades; and
    a cylindrical attaching portion which fixes the blades and the rotor; and
    the third resin portion is on a radially inner side away from the cylindrical attaching portion.

9. The blower apparatus according to claim 7, wherein an upper end of the third resin portion is on an axial lower side away from a lower end of the impeller.

10. The blower apparatus according to claim 7, wherein an upper end of the third resin portion is on an axial upper side away from a lower end of the impeller.

* * * * *